(12) United States Patent
Son et al.

(10) Patent No.: US 11,275,263 B2
(45) Date of Patent: Mar. 15, 2022

(54) PARTITION WALL PATTERN FILM AND METHOD OF MANUFACTURING THE SAME

(71) Applicant: LG Chem, Ltd., Seoul (KR)

(72) Inventors: Yong Goo Son, Daejeon (KR); Nam Seok Bae, Daejeon (KR); Seung Heon Lee, Daejeon (KR)

(73) Assignee: LG Chem, Ltd.

( * ) Notice: Subject to any disclaimer, the term of this patent is extended or adjusted under 35 U.S.C. 154(b) by 176 days.

(21) Appl. No.: 16/500,305

(22) PCT Filed: Mar. 14, 2019

(86) PCT No.: PCT/KR2019/002948
§ 371 (c)(1),
(2) Date: Oct. 2, 2019

(87) PCT Pub. No.: WO2019/203446
PCT Pub. Date: Oct. 24, 2019

(65) Prior Publication Data
US 2020/0319496 A1    Oct. 8, 2020

(30) Foreign Application Priority Data

Apr. 17, 2018  (KR) .................. 10-2018-0044325

(51) Int. Cl.
*G02F 1/1333*  (2006.01)
*G02F 1/1681*  (2019.01)
*G02F 1/167*   (2019.01)

(52) U.S. Cl.
CPC ........ *G02F 1/133377* (2013.01); *G02F 1/167* (2013.01); *G02F 1/1681* (2019.01)

(58) Field of Classification Search
CPC .......... G02F 1/13394; G02F 1/133512; G02F 1/133514; G02F 1/133377; G02F 1/167;
(Continued)

(56) References Cited

U.S. PATENT DOCUMENTS 4,902,108 A * 2/1990 Byker ................... B60R 1/088
359/265
2003/0016429 A1   1/2003 Ikeda et al.
(Continued)

FOREIGN PATENT DOCUMENTS

CN      105467713 A    4/2016
JP      2003005226 A   1/2003
(Continued)

OTHER PUBLICATIONS

Supplementary European Search Report with Written Opinion for U.S. Appl. No. 19/759,276 dated Jan. 7, 2020, 7 pages.
(Continued)

*Primary Examiner* — Brandi N Thomas
(74) *Attorney, Agent, or Firm* — Lerner, David, Littenberg, Krumholz & Mentlik, LLP

(57) ABSTRACT

A partition wall pattern film including a transparent substrate; a first electrode layer provided on the transparent substrate; a partition wall pattern provided on the first electrode layer; and a second electrode layer pattern provided on an entire upper surface of the partition wall pattern and at least a part of a lateral surface of the partition wall pattern.

17 Claims, 6 Drawing Sheets

(58) Field of Classification Search
CPC ......... G02F 1/1681; H01L 2924/00014; H01L 2924/00012; H01L 2224/0345; H01L 2224/03452; H01L 2224/0361; H01L 2224/05147; H01L 2224/05166; H01L 2224/05184; H01L 2224/05647; H01L 2224/11462; H01L 2224/1147; H01L 2224/13012; H01L 2224/13014; H01L 2224/13016; H01L 2224/13018; H01L 2224/131; H01L 2224/13111; H01L 2224/13144; H01L 2224/13147; H01L 2224/13155; H01L 2924/01074; H01L 2924/014; H01L 21/0337; H01L 21/304; H01L 21/30604; H01L 21/6835; H01L 21/76898; H01L 2221/68327; H01L 2221/6834; H01L 2224/03002; H01L 2224/03912; H01L 2224/0401; H01L 2224/05008; H01L 2224/05025; H01L 2224/05558; H01L 2224/05562; H01L 2224/05568; H01L 2224/0557; H01L 2224/11002; H01L 2224/13017; H01L 2224/13025; H01L 2224/13083; H01L 2224/14181

See application file for complete search history.

(56) References Cited

U.S. PATENT DOCUMENTS

| | | |
|---|---|---|
| 2006/0119568 A1 | 6/2006 | Ikeda |
| 2007/0120812 A1 | 5/2007 | Nagayama |
| 2008/0024432 A1* | 1/2008 | Lee ...................... G02F 1/1677 345/107 |
| 2012/0113499 A1 | 5/2012 | Komatsu |
| 2013/0182309 A1 | 7/2013 | Kim et al. |
| 2016/0012762 A1 | 1/2016 | Joo et al. |
| 2017/0090237 A1* | 3/2017 | Kim .................... H01L 27/3232 |
| 2018/0074377 A1 | 3/2018 | You et al. |

FOREIGN PATENT DOCUMENTS

| | | |
|---|---|---|
| JP | 2003270674 A | 9/2003 |
| JP | 2007057723 A | 3/2007 |
| JP | 2007121785 A | 5/2007 |
| JP | 2007139913 A | 6/2007 |
| JP | 2008033335 A | 2/2008 |
| JP | 2012098681 A | 5/2012 |
| JP | 2013057875 A | 3/2013 |
| KR | 20130040997 A | 4/2013 |
| KR | 20130084857 A | 7/2013 |
| KR | 1401117 B1 | 5/2014 |
| KR | 2016-0146566 A | 12/2016 |
| KR | 20170054918 A | 5/2017 |
| KR | 20170061984 A | 6/2017 |
| KR | 20180010485 A | 1/2018 |

OTHER PUBLICATIONS

International Search Report dated Jun. 20, 2019, in PCT/KR2019/002948, 3 pages.

* cited by examiner

[Figure 1]
<OFF MODE>
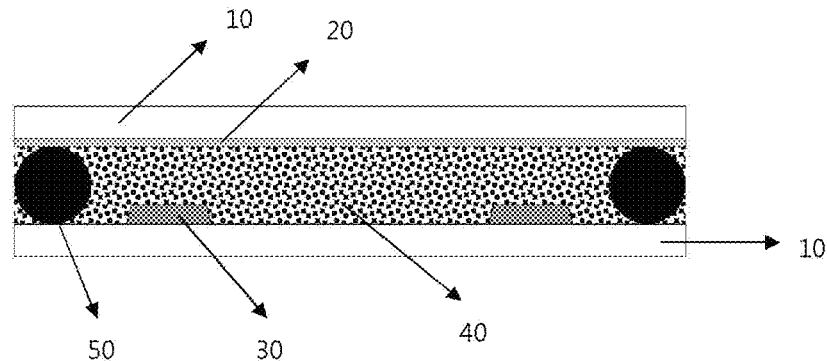
<ON MODE>
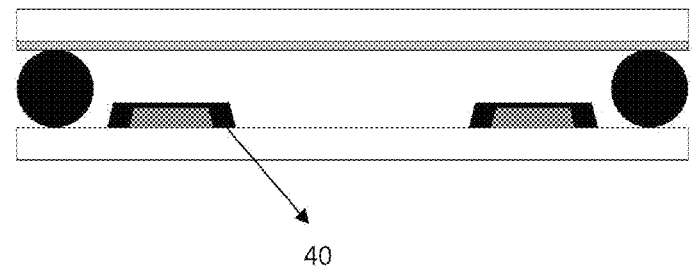
[Figure 2]
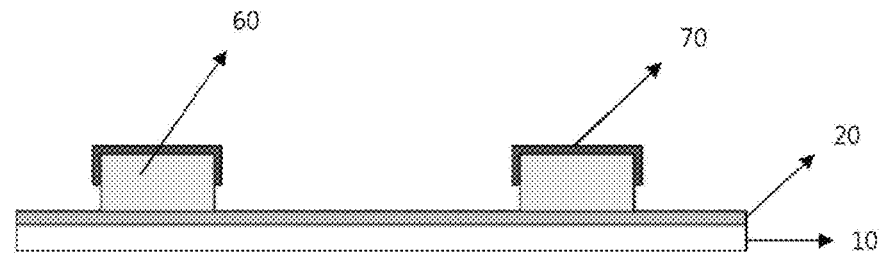

[Figure 3]
1) TRANSPARENT UV RESIN APPLICATION AND SELECTIVE EXPOSURE PROCESS
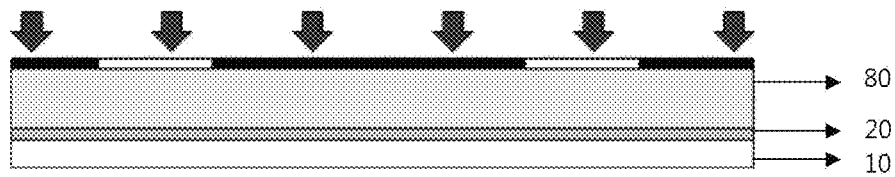
2) DEVELOPMENT PROCESS
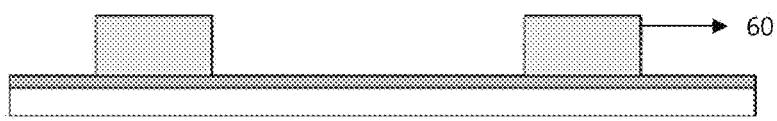
3) PREPARE BASE COATED WITH SECOND ELECTRODE LAYER PATTERN MATERIAL
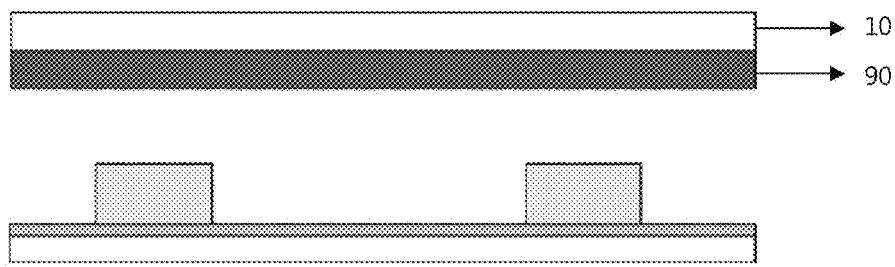
4) LAMINATION PROCESS
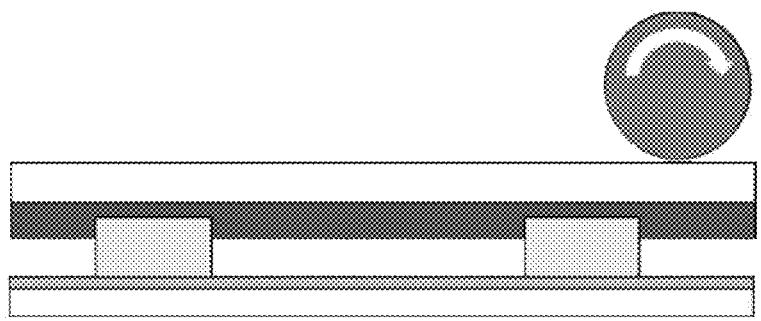
5) DELAMINATION PROCESS
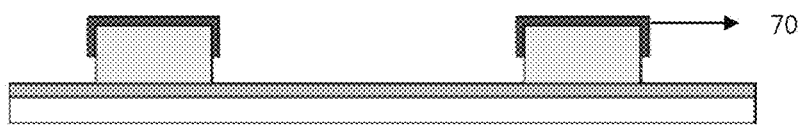

[Figure 4]
1) MANUFACTURE METAL MESH FILM AND PARTITION WALL PATTERN FILM
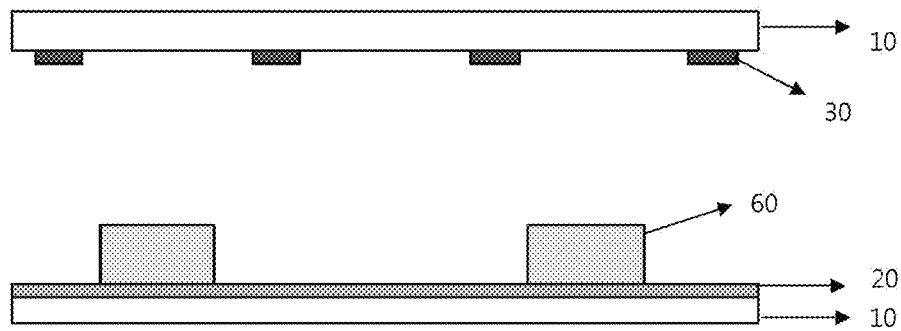
2) FORM ELECTRODE INSULATING LAYER ON TWO ELECTRODE FILMS
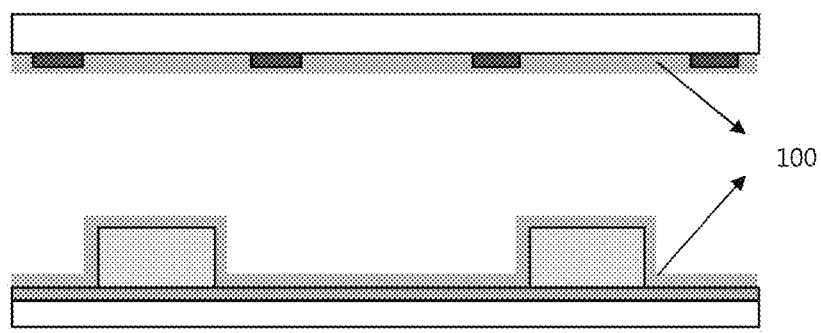
3) INJECT CHARGED INK AND LAMINATE FILM
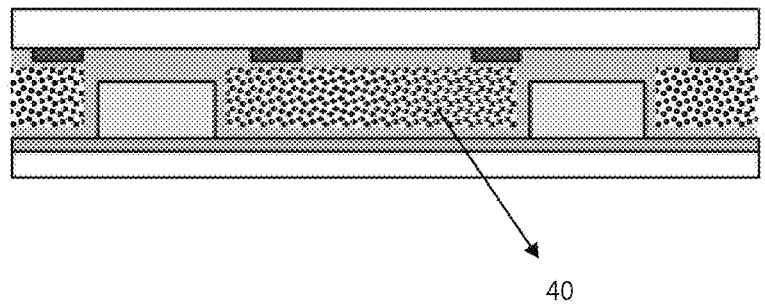

[Figure 5]
1) MANUFACTURE PARTITION WALL PATTERN FILM COMPRISING ELECTRODE LAYER
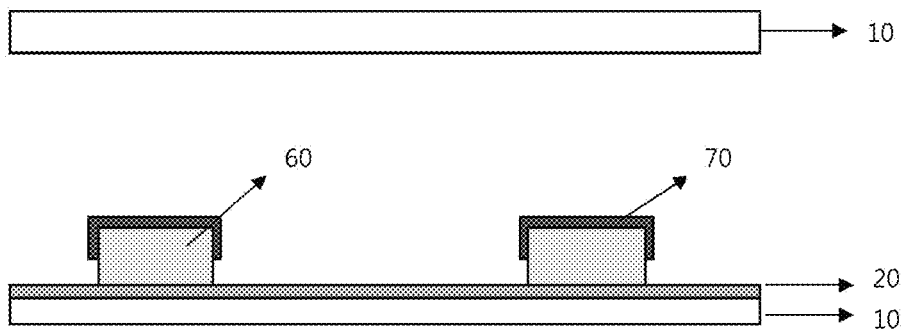
2) FORM ELECTRODE INSULATING LAYER ON PATTERN WALL FILM
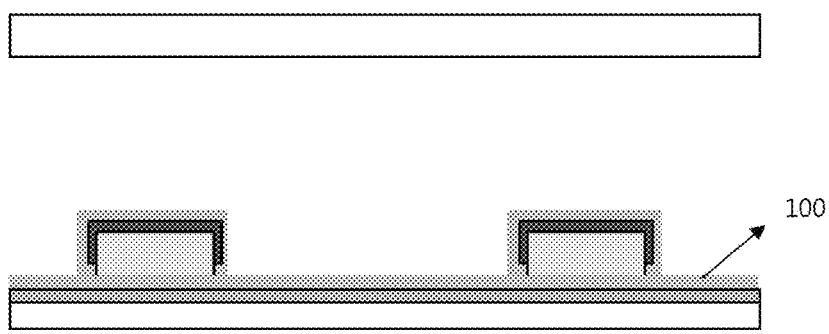
3) INJECT CHARGED INK AND LAMINATE FILM
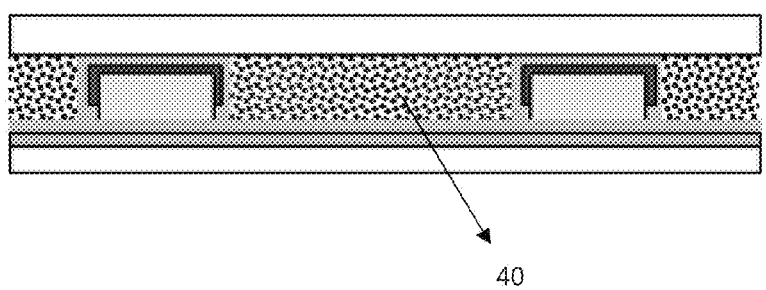

[Figure 6]
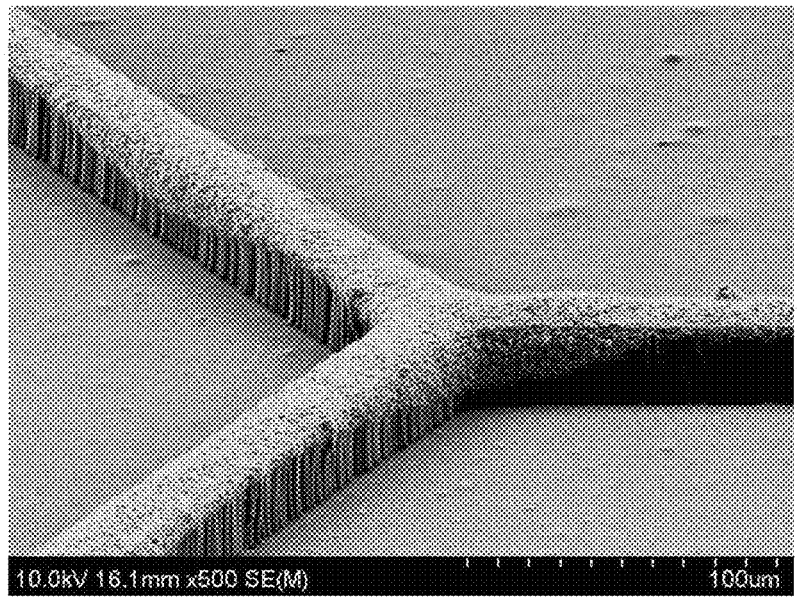
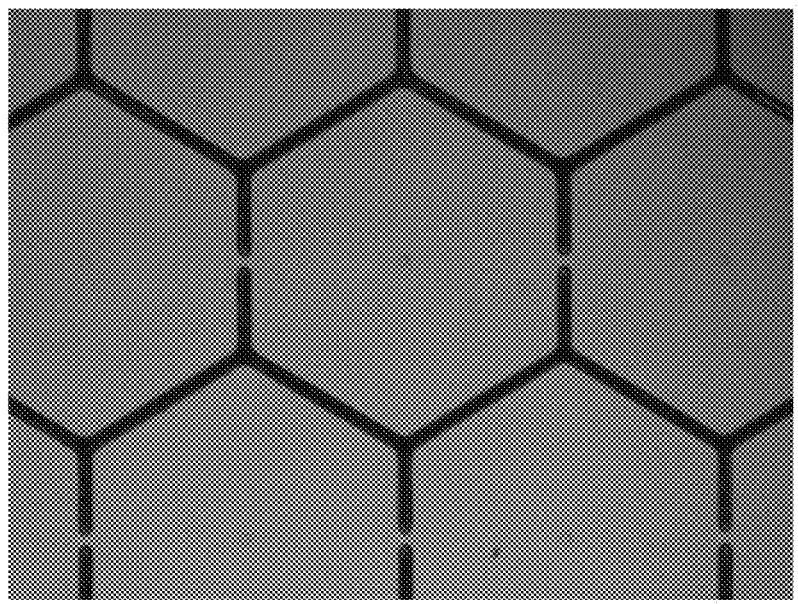

[Figure 7]
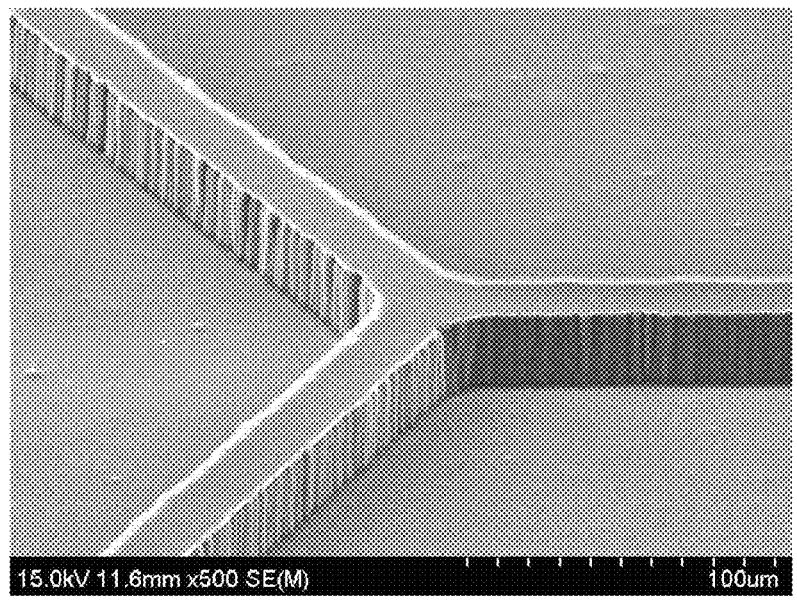
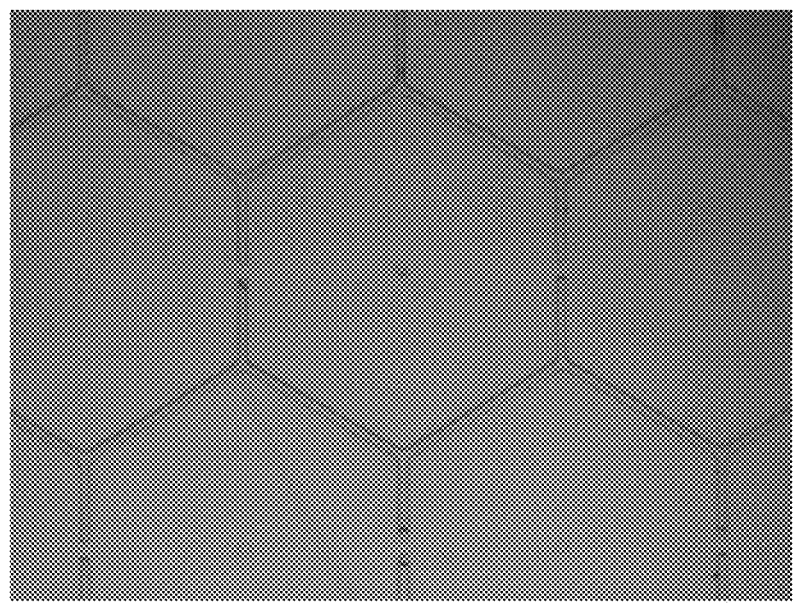

PARTITION WALL PATTERN FILM AND METHOD OF MANUFACTURING THE SAME

CROSS-REFERENCE TO RELATED APPLICATIONS

The present application is a national phase entry under 35 U.S.C. § 371 of International Application No. PCT/KR2019/002948 filed Mar. 14, 2019, published in Korean, which claims priority from Korean Patent Application No. 10-2018-0044325 filed Apr. 17, 2018, all of which are incorporated herein by reference.

TECHNICAL FIELD

The present application relates to a partition wall pattern film and a method of manufacturing the same.

BACKGROUND ART

An electrophoretic variable transmittance film is easy to transmit and block light entering from outside and thus may be used as a smart window for building, a sunroof for a vehicle, and a light blocking film for a transparent display. FIG. 1 is a view illustrating an operating principle of an electrophoretic variable transmittance film in the related art which operates in a light blocking mode and a light transmitting mode.

In general, as illustrated in FIG. 1, in order to switch from the light blocking mode to the light transmitting mode, a positive voltage is applied to a metal electrode pattern 30, and negatively charged nanoparticles 40 are concentrated on the metal electrode pattern having a relatively small electrode width, such that the light blocking mode may be converted into the light transmitting mode.

However, there is a problem in that visibility is increased because of ball spacers 50 used to maintain a distance between the metal electrode pattern 30 and a transparent substrate 10 in the electrophoretic variable transmittance film.

DETAILED DESCRIPTION OF THE INVENTION

Technical Problem

The present application has been made in an effort to provide a partition wall pattern film and a method of manufacturing the same.

Technical Solution

An exemplary embodiment of the present application provides a partition wall pattern film comprising: a transparent substrate; a first electrode layer provided on the transparent substrate; a partition wall pattern provided on the first electrode layer; and a second electrode layer pattern provided on an entire upper surface of the partition wall pattern and at least a part of a lateral surface of the partition wall pattern.

In addition, another exemplary embodiment of the present application provides a method of manufacturing a partition wall pattern film, the method comprising: forming a first electrode layer on a first transparent substrate; forming a partition wall pattern on the first electrode layer; and forming a second electrode layer pattern on an entire upper surface of the partition wall pattern and at least a part of a lateral surface of the partition wall pattern.

In addition, still another exemplary embodiment of the present application provides a variable transmittance film comprising the partition wall pattern film.

Advantageous Effects

According to the exemplary embodiment of the present application, since the second electrode layer pattern is provided on the entire upper surface and at least a part of the lateral surface of the partition wall pattern, it is possible to exclude a separate metal mesh electrode film that was applied in the related art. Therefore, it is possible to reduce manufacturing process costs, and because the second electrode layer pattern, which corresponds to the partition wall pattern in a one-to-one manner, is provided, it is possible to prevent a decrease in variable transmittance range and an increase in haze which are caused by applying the metal mesh electrode film.

In addition, a leakage of light occurs at a partition wall pattern in a light blocking mode in the case of the variable transmittance film comprising the partition wall pattern in the related art. However, in the variable transmittance film comprising the partition wall pattern film according to the exemplary embodiment of the present application, the second electrode layer pattern provided on the upper surface of the partition wall pattern may serve as a light blocking layer, and as a result, it is possible to prevent a leakage of light.

In addition, two electrode films were required to be coated with electrode insulating layers, respectively, in the case of a variable transmittance film comprising a partition wall pattern in the related art. However, because the electrode insulating layer coating can be applied once to the variable transmittance film comprising the partition wall pattern film according to the exemplary embodiment of the present application, it is possible to simplify the manufacturing process.

BRIEF DESCRIPTION OF DRAWINGS

FIG. 1 is a view schematically illustrating a variable transmittance film in the related art.

FIG. 2 is a view schematically illustrating a partition wall pattern film according to an exemplary embodiment of the present application.

FIG. 3 is a view schematically illustrating a method of manufacturing a partition wall pattern film according to an exemplary embodiment of the present application.

FIG. 4 is a view schematically illustrating a method of manufacturing a variable transmittance film in the related art.

FIG. 5 is a view schematically illustrating a method of manufacturing a variable transmittance film according to an exemplary embodiment of the present application.

FIG. 6 is a view illustrating an SEM image of a partition wall pattern film according to Example 1 of the present application.

FIG. 7 is a view illustrating an SEM image of a partition wall pattern film according to Comparative Example 1 of the present application.

DESCRIPTION OF REFERENCE NUMERALS

10: Transparent substrate
11: Second transparent substrate
20: First electrode layer 30: Second electrode pattern
40: Negatively (−) charged carbon black nanoparticles
50: Ball spacer
60: Partition wall pattern
70: Second electrode layer pattern
80: Transparent UV resin
90: Second electrode layer
100: Electrode insulating layer

DETAILED DESCRIPTION

Hereinafter, the present application will be described in detail.

In the present application, the term "transparent" means that transmittance is about 80% or higher in a visible ray region (400 nm to 700 nm).

Typically, it is essential to use a transparent electrode film and a metal pattern electrode film in order to manufacture an electrophoretic variable transmittance film. In addition, a cell gap needs to be maintained in order to inject an electrophoretic substance such as a negatively (−) charged carbon black particle dispersed solution between the two electrode films. To this end, a ball spacer, a column spacer pattern, or a partition wall pattern needs to be provided. A variable transmittance film in the related art is schematically illustrated in FIG. 1.

In addition, because both a metal mesh electrode pattern and a partition wall pattern are applied in the related art, there are problems in that a variable transmittance region is decreased, light scattering is increased, and a haze is increased.

Therefore, the present application is intended to provide a partition wall pattern film and a method of manufacturing the same which are capable of solving the above-mentioned problems.

The partition wall pattern film according to the exemplary embodiment of the present application comprises: a transparent substrate; a first electrode layer provided on the transparent substrate; a partition wall pattern provided on the first electrode layer; and a second electrode layer pattern provided on an entire upper surface and at least a part of a lateral surface of the partition wall pattern.

In the present application, the transparent substrate may be, but not limited to, a glass base or a transparent plastic base which is excellent in transparency, surface smoothness, tractability, and waterproofness, and the transparent base is not limited as long as the transparent base is typically used for electronic elements. Specifically, the transparent base may be made of glass; urethane resin; polyimide resin; polyester resin; (meth)acrylate-based polymeric resin; or polyolefin-based resin such as polyethylene or polypropylene.

In the present application, the first electrode layer may comprise a transparent conductive oxide, and the second electrode layer pattern may comprise metal or a metal alloy. More specifically, the first electrode layer may comprise, but not limited only to, one or more of an indium oxide, a zinc oxide, an indium tin oxide, an indium zinc oxide, and an indium zinc tin oxide. In addition, the second electrode layer pattern may comprise, but not limited only to, gold, silver, aluminum, copper, neodymium, molybdenum, nickel, or an alloy thereof.

In the present application, a line height of the partition wall pattern may be 5 μm or more, and a line width of the partition wall pattern may be 30 μm or less. In addition, a line height of the partition wall pattern may be 5 μm to 50 μm, and a line width of the partition wall pattern may be 5 μm to 30 μm. If the line height of the partition wall pattern is less than 5 μm, a distance between a transparent electrode and a metal electrode pattern substrate is decreased, such that the content of negatively (−) charged nanoparticles in a dispersion liquid is excessively increased in order to ensure the transmittance of 1% or less in the light blocking mode, and as a result, there may be a problem in that a dispersion property of the negatively (−) charged nanoparticles deteriorates when a variable transmittance element operates. In addition, if the line height of the partition wall pattern is more than 50 μm, the distance between the transparent electrode and the metal electrode pattern substrate is increased, and as a result, an operating speed may be decreased. A cell gap between the electrodes may be determined based on the line height of the partition wall pattern. More specifically, if the cell gap is small, concentration of a light blocking dispersion liquid may be increased in order to ensure a light blocking property, and an excessive increase in concentration of charged particles may degrade dispersion stability. In addition, if the cell gap is large, intensity of an electric field formed between the transparent electrode and the metal pattern may be decreased, and an electrophoretic property, that is, a movement speed of particles may be decreased as the distance between the charged particles and the metal pattern is increased.

A line spacing of the partition wall pattern may be 100 μm to 1,000 μm. If the line spacing of the partition wall pattern is less than 100 μm, a variable transmittance range may be decreased due to an increase in area of a region of the partition wall pattern. If the line spacing of the partition wall pattern is more than 1,000 μm, an upper base may sag during a process of laminating the base on the partition wall pattern. In this case, the second electrode layer may be transferred to a region other than the partition wall pattern during the process of forming the second electrode layer pattern or it may be difficult to maintain a uniform cell gap of an electrophoretic element. There is no variable transmittance in a region in which the partition wall pattern is present, and as a result, an area of the variable transmittance region is decreased if the line spacing of the partition wall pattern is too small when the line width remains the same. In contrast, if the line spacing of the partition wall pattern is too large, a substrate (film) is deformed during a process of laminating a transparent electrode substrate and a metal pattern substrate, and as a result, bubbles may be produced, and uniformity of the cell gap may deteriorate.

In the exemplary embodiment of the present application, an additional dot pattern may be provided at a central portion of the partition wall pattern to increase the line spacing of the partition wall pattern in order to ensure the variable transmittance range. In this case, it is possible to minimize an increase in variable transmittance range and to prevent the base from sagging during a lamination process.

In the present application, the partition wall pattern may be made of a UV-curable resin composition, and the UV-curable resin composition may comprise, but not limited only to, one or more of an acrylic monomer, an acrylic oligomer, and a photoinitiator.

In the present application, the partition wall pattern may be formed by applying the UV-curable resin composition onto the first electrode layer and then performing a selective exposure process (301) and a development process (302).

In the present application, the second electrode layer pattern is provided on an entire upper surface and at least a part of a lateral surface of the partition wall pattern.

A leakage of light occurs at a partition wall pattern in a light blocking mode in the case of the variable transmittance film comprising the partition wall pattern in the related art. However, in the variable transmittance film comprising the partition wall pattern film according to the exemplary embodiment of the present application, the second electrode layer pattern provided on the upper surface of the partition wall pattern may serve as a light blocking layer, and as a result, it is possible to prevent a leakage of light.

A thickness of the second electrode layer pattern may be 200 nm to 2 µm. If the thickness of the second electrode layer pattern is less than 200 nm, resistance of the electrode layer pattern may excessively increase, or a light blocking property may deteriorate. If the thickness of the second electrode layer pattern is more than 2 µm, there may be a problem in that a variable transmittance range is decreased as the line width of the partition wall pattern is increased.

The second electrode layer pattern may be provided on the entire upper surface of the partition wall pattern in order to ensure the light blocking property and implement electrical connection. In addition, the second electrode layer pattern may be provided on at least a part of the lateral surface of the partition wall pattern. A region of the second electrode layer pattern provided on at least a part of the lateral surface of the partition wall pattern may be 2 µm to a value, which is produced by subtracting 2 µm from the line height of the partition wall pattern, downward from the upper surface of the partition wall pattern. If the region of the second electrode layer pattern provided on at least a part of the lateral surface of the partition wall pattern is less than 2 µm downward from the upper surface of the partition wall pattern, an area of the electrode pattern for concentrating charged particles is decreased, and as a result, an electrophoretic property may deteriorate. In addition, if the region of the second electrode layer pattern provided on at least a part of the lateral surface of the partition wall pattern is more than the value, which is produced by subtracting 2 µm from the line height of the partition wall pattern, downward from the upper surface of the partition wall pattern, the first electrode layer disposed at a lower side may be electrically short-circuited due to metal migration.

The partition wall pattern film according to the exemplary embodiment of the present application is schematically illustrated in FIG. 2. As illustrated in FIG. 2, the partition wall pattern film according to the exemplary embodiment of the present application comprises: a transparent substrate 10; a first electrode layer 20 provided on the transparent substrate 10; a partition wall pattern 60 provided on the first electrode layer 20; and a second electrode layer pattern 70 provided on an entire upper surface and at least a part of a lateral surface of the partition wall pattern 60.

According to the exemplary embodiment of the present application, since the second electrode layer pattern is provided on the entire upper surface and at least a part of the lateral surface of the partition wall pattern, it is possible to exclude a separate metal mesh electrode film that was applied in the related art. Therefore, it is possible to reduce manufacturing process costs, and because the second electrode layer pattern, which corresponds to the partition wall pattern in a one-to-one manner, is provided, it is possible to prevent a decrease in variable transmittance range and an increase in haze which are caused by applying the metal mesh electrode film.

In the present application, an electrode insulating layer may be further provided on the partition wall pattern film. Two electrode films were required to be coated with electrode insulating layers, respectively, in the case of a variable transmittance film comprising a partition wall pattern in the related art. However, because the electrode insulating layer coating can be applied once to the variable transmittance film comprising the partition wall pattern film according to the exemplary embodiment of the present application, it is possible to simplify the manufacturing process.

The electrode insulating layer may be formed to have a thickness of 100 nm by curing a fluorine-based or silicon-based UV-curable resin composition having a surface energy of 20 dyne/cm or less by using bar coating, slot die coating, or the like. If the surface energy of the electrode insulating layer is more than 20 dyne/cm, negatively (−) charged nanoparticles are adsorbed on a surface of an electrode film, such that transmittance may be decreased in a light transmitting mode.

In addition, a method of manufacturing a partition wall pattern film according to the exemplary embodiment of the present application comprises: forming a first electrode layer on a first transparent substrate; forming a partition wall pattern on the first electrode layer; and forming a second electrode layer pattern on an entire upper surface and at least a part of a lateral surface of the partition wall pattern.

The method of manufacturing the partition wall pattern film according to the exemplary embodiment of the present application is schematically illustrated in FIG. 3. As illustrated in FIG. 3, the method of manufacturing the partition wall pattern film according to the exemplary embodiment of the present application comprises: forming the first electrode layer 20 on the first transparent substrate 10 (301); forming the partition wall pattern 60 on the first electrode layer 20 (302); and forming the second electrode layer pattern 70 on the entire upper surface and at least a part of the lateral surface of the partition wall pattern 60 (303-305).

In the present application, the forming of the first electrode layer on the first transparent substrate (301) may use a method known in this technical field. More specifically, the forming of the first electrode layer on the first transparent substrate may use, but not limited only to, a deposition process or the like.

In the exemplary embodiment of the present application, the forming of the second electrode layer pattern comprises: forming a second electrode layer 90 on a second transparent substrate 11 (303); forming the second electrode layer pattern on the entire upper surface and at least a part of the lateral surface of the partition wall pattern by laminating the second transparent substrate formed with the second electrode layer and the first transparent substrate formed with the partition wall pattern so that the second electrode layer and the partition wall pattern are in contact with each other (304); and removing the second transparent substrate 11 formed with the second electrode layer and heating the second electrode layer pattern 70 formed on the entire upper surface and at least a part of the lateral surface of the partition wall pattern 60.

A method of forming the second electrode layer on the second transparent substrate may use, but not limited only to, a method of coating the second transparent substrate with paste comprising metal or a metal alloy.

In addition, the exemplary embodiment of the present application provides a variable transmittance film comprising the partition wall pattern film.

The variable transmittance film according to the exemplary embodiment of the present application may be formed by using a material and a method which are known in this technical field, except that the variable transmittance film comprises the partition wall pattern film.

For example, the variable transmittance film may have a third transparent substrate provided on the partition wall pattern film. Negatively (−) charged nanoparticles are comprised between the partition wall pattern film and the third transparent substrate.

The negatively (−) charged nanoparticle may be, but not limited only to, a carbon black nanoparticle.

The variable transmittance film may be manufactured by using, but not limited only to, a method of preparing the above-mentioned variable transmittance film (401, 501) and then injecting a solution, in which the negatively (−) charged nanoparticles 400 are dispersed, between the partition wall pattern film and the third transparent substrate (403, 503).

FIG. 4 schematically illustrates the method of manufacturing the variable transmittance film (401) in the related art, and FIG. 5 schematically illustrates the method of manufacturing the variable transmittance film (501) according to the exemplary embodiment of the present application. As illustrated in FIGS. 4 and 5, two electrode films were required to be coated with electrode insulating layers 100, 130, respectively (402), in the case of the variable transmittance film comprising a partition wall pattern in the related art. However, because the electrode insulating layer coating 100 can be applied once to the variable transmittance film comprising the partition wall pattern film (502) according to the exemplary embodiment of the present application, it is possible to simplify the manufacturing process.

In the present application, the variable transmittance film may be operated by electrophoresis. The transmittance is decreased when the variable transmittance film according to the exemplary embodiment of the present application is in an OFF mode. The transmittance may be increased as the negatively (−) charged nanoparticles are concentrated on the metal pattern, which is a positive (+) electrode, due to the electrophoresis, in an ON mode in which a voltage is applied to the first electrode layer and the second electrode layer pattern.

EXAMPLE EMBODIMENTS

Hereinafter, example embodiments disclosed in the present specification will be described with reference to Examples. However, the scope of the example embodiments is not intended to be limited by the following Examples.

Example 1

1) Manufacture of Transparent UV-Curable Resin Composition

A transparent UV-curable resin composition was manufactured with compositions shown in Table 1.

TABLE 1

| Product Name | Manufacturer | Content (wt. %) |
|---|---|---|
| CN9010 NS (Alicyclic urethane acrylate monomer) | Sartomer | 28.5 |
| CN8004 (Alicyclic urethane acrylate monomer) | Sartomer | 28.5 |
| SR444NS (Pentaerythritol triacrylate) | Sartomer | 38 |
| Irgacure 184 (Photoinitiator) | Ciba | 4 |
| SR9051 (Attachment force enhancer) | Sartomer | 1 |
| Sum | | 100 |

2) Manufacture of Transparent Partition Wall Pattern Film

The transparent UV-curable resin composition was applied onto an ITO film having surface resistance of 150 Ω/sq., and then a photo imprinting mask was roll-pressed with a pressure of 0.5 MPa and at a rate of 0.1 mpm. The laminate was irradiated, from above thereof, with exposure energy of 200 mJ/cm$^2$ by using a UV curing device with a wavelength of 365 nm, and then a photo imprinting mold was separated from the ITO film. The ITO film having a transparent partition wall pattern was manufactured by immersing the exposed ITO film in a developer (LSG-202. LG Chem, Ltd.) for 2 minutes and then washing the ITO film.

The partition wall pattern manufactured by the photo imprinting process had a line width of 20 μm, a line height of 25 μm, and a line spacing of 500 μm.

3) Forming of Second Electrode Layer Pattern

The transparent partition wall pattern film was fixed onto a stone surface plate having excellent smoothness.

Silver ink (TEC-PR-041, InkTec Inc.) having a thickness of 1 μm was applied onto an upper portion of a glass substrate having a thickness of 1 mm by using a spin coating method, and then an upper portion of the fixed transparent partition wall pattern film was brought into contact with the surface of the glass substrate onto which the silver ink was applied. The contact state was maintained for 5 minutes without applying a separate pressure, and then the glass substrate was removed. The partition wall pattern film was separated from the stone surface plate, and then the silver ink was sintered by performing a heating process at 130° C. for 20 minutes.

Comparative Example 1

A process identical to the process of Example 1 was performed without applying the process of forming the second electrode layer pattern in Example 1.

FIG. 6 illustrates an SEM image of the partition wall pattern film according to Example 1 of the present application, and FIG. 7 illustrates an SEM image of the partition wall pattern film according to Comparative Example 1 of the present application.

As a result, according to the exemplary embodiment of the present application, since the second electrode layer pattern is provided on the entire upper surface and at least a part of the lateral surface of the partition wall pattern, it is possible to exclude a separate metal mesh electrode film that was applied in the related art. Therefore, it is possible to reduce manufacturing process costs, and because the second electrode layer pattern, which corresponds to the partition wall pattern in a one-to-one manner, is provided, it is possible to prevent a decrease in variable transmittance range and an increase in haze which are caused by applying the metal mesh electrode film.

In addition, a leakage of light occurs at a partition wall pattern in a light blocking mode in the case of the variable transmittance film comprising the partition wall pattern in the related art. However, in the variable transmittance film comprising the partition wall pattern film according to the exemplary embodiment of the present application, the second electrode layer pattern provided on the upper surface of the partition wall pattern may serve as a light blocking layer, and as a result, it is possible to prevent a leakage of light.

In addition, two electrode films were required to be coated with electrode insulating layers, respectively, in the case of a variable transmittance film comprising a partition wall pattern in the related art. However, because the electrode insulating layer coating can be applied once to the variable transmittance film comprising the partition wall pattern film according to the exemplary embodiment of the present application, it is possible to simplify the manufacturing process.

The invention claimed is:

1. A partition wall pattern film comprising:
a transparent substrate;
a first electrode layer provided on the transparent substrate;
a partition wall pattern comprising a plurality of partition walls provided on the first electrode layer; and
a second electrode layer pattern comprising a plurality of separate second electrode layer portions, each second electrode layer portion provided on a respective partition wall of the plurality of partition walls and covering:
an entire upper surface of the respective partition wall; and
at least a part of a lateral surface of the respective partition wall.

2. The partition wall pattern film of claim 1, wherein the first electrode layer comprises a transparent conductive oxide, and the second electrode layer pattern comprises metal or a metal alloy.

3. The partition wall pattern film of claim 2, wherein the first electrode layer comprises one or more of an indium oxide, a zinc oxide, an indium tin oxide, an indium zinc oxide, and an indium zinc tin oxide.

4. The partition wall pattern film of claim 2, wherein the second electrode layer pattern comprises gold, silver, aluminum, copper, neodymium, molybdenum, nickel, or an alloy thereof.

5. The partition wall pattern film of claim 1, wherein a line height of the partition wall pattern is 5 μm or more.

6. The partition wall pattern film of claim 1, wherein a line width of the partition wall pattern is 30 μm or less.

7. The partition wall pattern film of claim 1, wherein a line spacing of the partition wall pattern is 100 μm to 1,000 μm.

8. The partition wall pattern film of claim 1, wherein a thickness of the second electrode layer pattern is 200 nm to 2 μm.

9. The partition wall pattern film of claim 1, wherein a region of the second electrode layer pattern provided on the at least a part of the lateral surface of the partition wall pattern is positioned at least 2 μm downward from the upper surface of the partition wall pattern, and at most 2 μm less than a line height of the partition wall pattern downward from the upper surface of the partition wall pattern.

10. The partition wall pattern film of claim 1, wherein an electrode insulating layer is further provided on the partition wall pattern film.

11. A method of manufacturing a partition wall pattern film, the method comprising:
forming a first electrode layer on a first transparent substrate;
forming a partition wall pattern comprising a plurality of partition walls on the first electrode layer; and
forming a second electrode layer pattern comprising a plurality of separate second electrode layer portions, each second electrode layer portions being formed on a respective partition wall of the plurality of partition walls and covering:
an entire upper surface of the partition wall pattern; and
at least a part of a lateral surface of the partition wall pattern.

12. The method of claim 11, wherein the forming of the second electrode layer pattern comprises:
forming a second electrode layer on a second transparent substrate;
forming the second electrode layer pattern on the entire upper surface of the partition wall pattern and the at least a part of the lateral surface of the partition wall pattern by laminating the second transparent substrate formed with the second electrode layer and the first transparent substrate formed with the partition wall pattern so that the second electrode layer and the partition wall pattern are in contact with each other; and
removing the second transparent substrate formed with the second electrode layer and heating the second electrode layer pattern formed on the entire upper surface of the partition wall pattern and the at least a part of the lateral surface of the partition wall pattern.

13. The method of claim 11, further comprising:
forming an electrode insulating layer on the partition wall pattern film after the forming of the second electrode layer pattern.

14. A variable transmittance film comprising the partition wall pattern film according to claim 1.

15. The variable transmittance film of claim 14, wherein the variable transmittance film is operated by electrophoresis.

16. The variable transmittance film of claim 14, wherein a transmittance of the variable transmittance film is increased when a voltage is applied to the first electrode layer and the second electrode layer pattern.

17. A partition wall pattern film comprising:
a transparent substrate;
a first electrode layer provided on the transparent substrate;
a partition wall pattern provided on the first electrode layer; and
a second electrode layer pattern provided on:
an entire upper surface of the partition wall pattern; and
at least a part of a lateral surface of the partition wall pattern
wherein the first electrode layer and second electrode layer pattern are configured to increase transmittance through the partition wall pattern film in response to a voltage applied to the first electrode layer and second electrode layer pattern.

* * * * *